(12) United States Patent
Kim et al.

(10) Patent No.: US 12,298,586 B2
(45) Date of Patent: May 13, 2025

(54) CAMERA MODULE INCLUDING LIQUID LENS

(71) Applicant: LG INNOTEK CO., LTD., Seoul (KR)

(72) Inventors: Ui Jun Kim, Seoul (KR); Young Woon Kim, Seoul (KR); Young Seop Moon, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 953 days.

(21) Appl. No.: 17/415,935

(22) PCT Filed: Dec. 13, 2019

(86) PCT No.: PCT/KR2019/017682
§ 371 (c)(1),
(2) Date: Jun. 18, 2021

(87) PCT Pub. No.: WO2020/130503
PCT Pub. Date: Jun. 25, 2020

(65) Prior Publication Data
US 2022/0066122 A1    Mar. 3, 2022

(30) Foreign Application Priority Data
Dec. 18, 2018  (KR) .................. 10-2018-0164475

(51) Int. Cl.
*G02B 7/02*  (2021.01)
*G02B 3/14*  (2006.01)
(Continued)

(52) U.S. Cl.
CPC .............. *G02B 7/028* (2013.01); *G02B 3/14* (2013.01); *G02B 7/008* (2013.01); *H04N 23/54* (2023.01); *G02B 7/003* (2013.01)

(58) Field of Classification Search
CPC .......... G02B 7/028; G02B 3/14; G02B 7/008; G02B 7/003; G02B 27/646; G02B 3/12; H04N 23/54; H04N 23/55; H04N 23/57
See application file for complete search history.

(56) References Cited

U.S. PATENT DOCUMENTS 9,575,221 B2 *  2/2017  Nunnink .............. G02B 26/004
10,097,742 B1   10/2018  Moon et al.
(Continued)

FOREIGN PATENT DOCUMENTS

JP   2008-158195 A   7/2008
JP   2009-025523 A   2/2009
(Continued)

*Primary Examiner* — Cara E Rakowski
*Assistant Examiner* — Jennifer A Jones
(74) *Attorney, Agent, or Firm* — Birch, Stewart, Kolasch & Birch, LLP

(57) ABSTRACT

A camera module according to an embodiment includes a liquid lens including a first plate and an individual electrode disposed on a first surface of the first plate; a plurality of temperature detection elements disposed on the first surface of the first plate so as to be spaced apart from the individual electrode; and a temperature sensor connected to the plurality of temperature detection elements to sense a temperature of the liquid lens, wherein the plurality of temperature detection elements includes first and second temperature detection elements spaced apart from each other, wherein the temperature sensor is connected to one end of the first temperature detection element, and wherein an opposite end of the first temperature detection element is connected to one end of the second temperature detection element, and an opposite end of the second temperature detection element is connected to a reference potential.

19 Claims, 12 Drawing Sheets

(51) Int. Cl.
*G02B 7/00* (2021.01)
*H04N 23/54* (2023.01)

(56) References Cited

U.S. PATENT DOCUMENTS

| | | |
|---|---|---|
| 11,474,284 B2 * | 10/2022 | Kaminski ............ G02B 3/0006 |
| 2006/0187433 A1 | 8/2006 | Nagahashi |
| 2010/0232028 A1 * | 9/2010 | Takai .................... G02B 3/0006 |
| | | 359/665 |
| 2012/0026596 A1 | 2/2012 | Berge et al. |
| 2014/0268361 A1 | 9/2014 | Nunnink et al. |
| 2015/0338557 A1 | 11/2015 | Nunnink et al. |
| 2019/0377236 A1 | 12/2019 | Jang et al. |
| 2021/0003748 A1 * | 1/2021 | Dawson-Elli ............ G02B 3/14 |
| 2021/0239885 A1 * | 8/2021 | Lee ........................ G03B 13/32 |

FOREIGN PATENT DOCUMENTS

| | | | | |
|---|---|---|---|---|
| KR | 10-1821189 B1 | 1/2018 | | |
| KR | 20180027049 A | * | 3/2018 | ........... G02B 3/0087 |
| KR | 10-2018-0087082 A | 8/2018 | | |
| KR | 10-2018-0106347 A | 10/2018 | | |
| KR | 10-2018-0114804 A | 10/2018 | | |
| WO | WO 2010/143662 A1 | 12/2010 | | |
| WO | WO-2018139859 A1 | * | 8/2018 | ........... G02B 27/646 |
| WO | WO-2019212259 A1 | * | 11/2019 | ........... G02B 27/646 |

* cited by examiner

[FIG. 1]
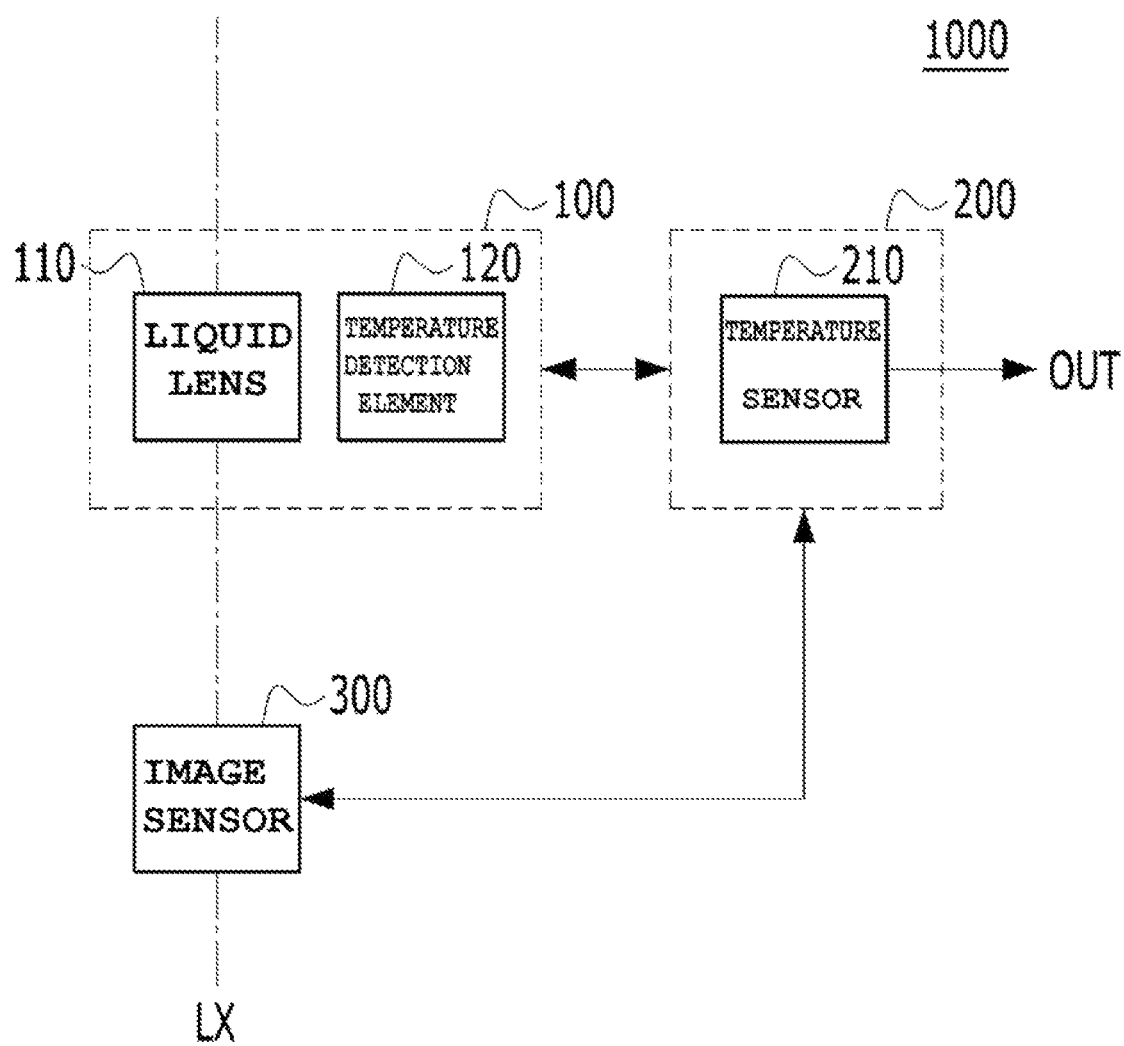

[FIG. 2]
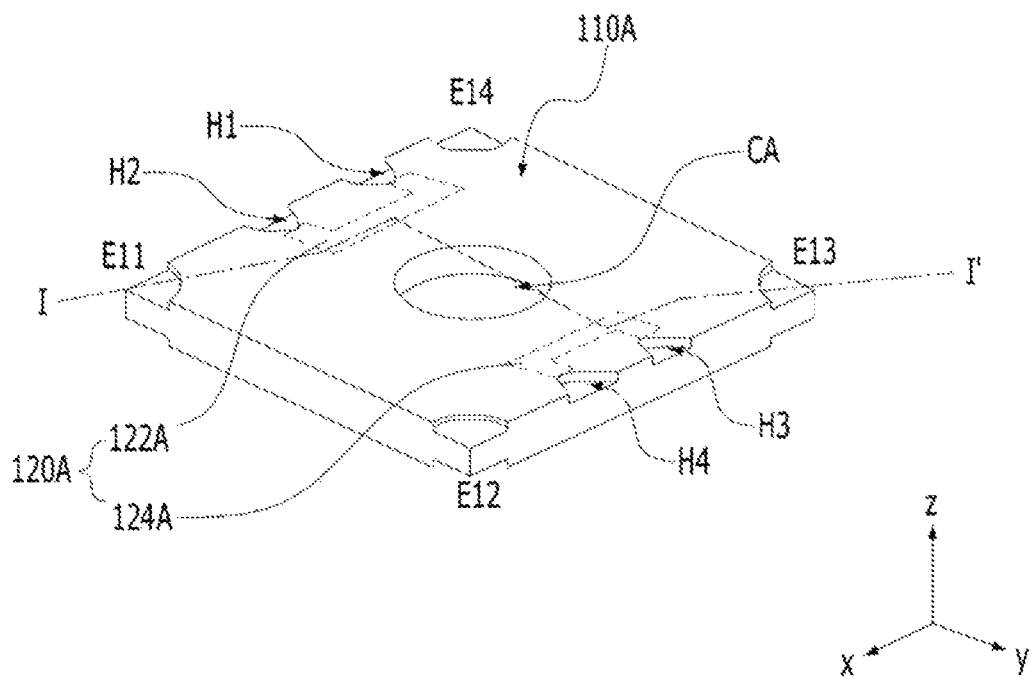
[FIG. 3]
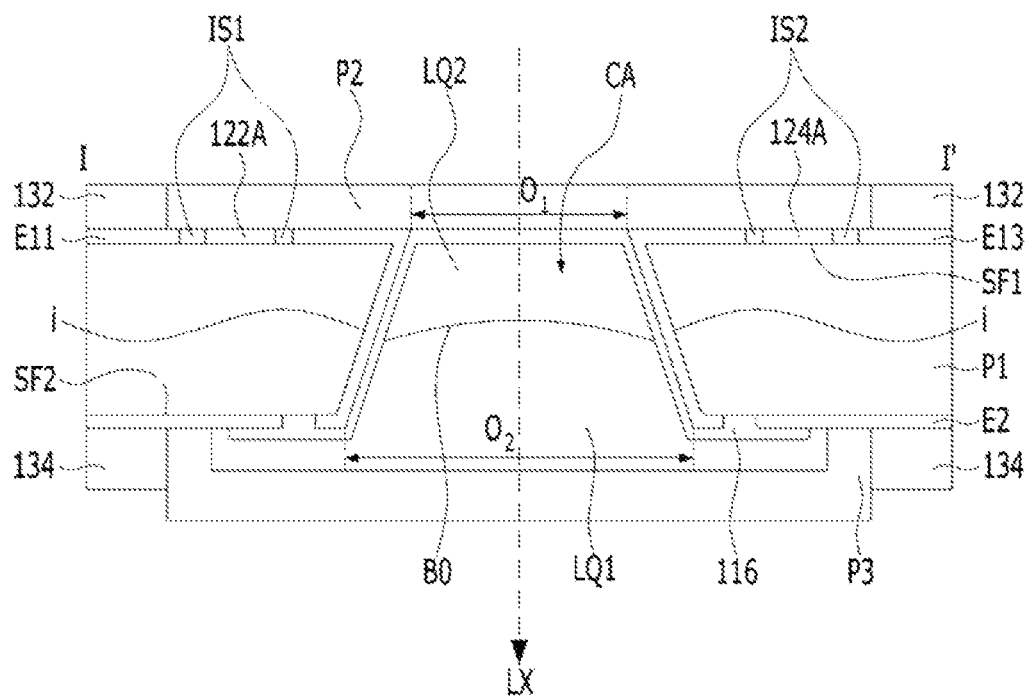

[FIG. 4]
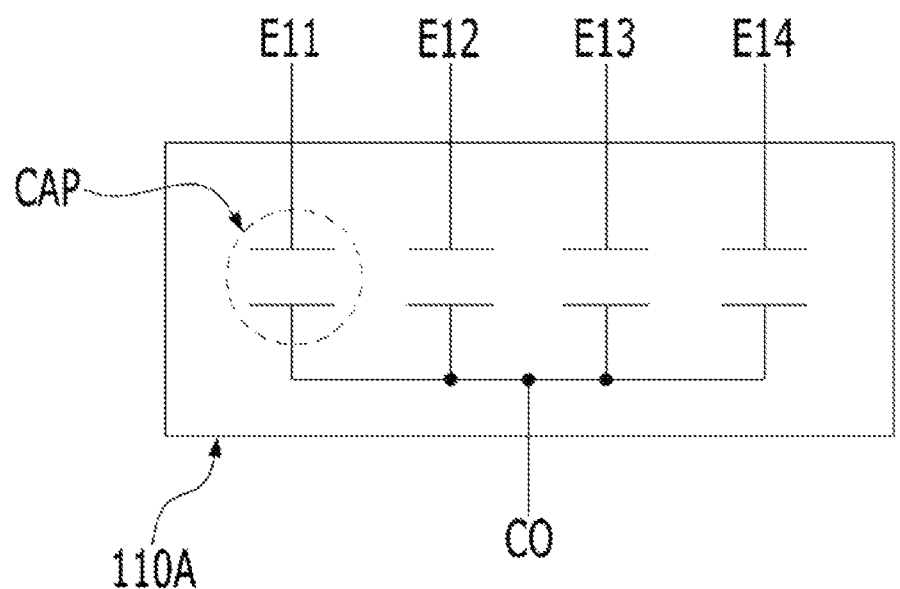

[FIG. 5]
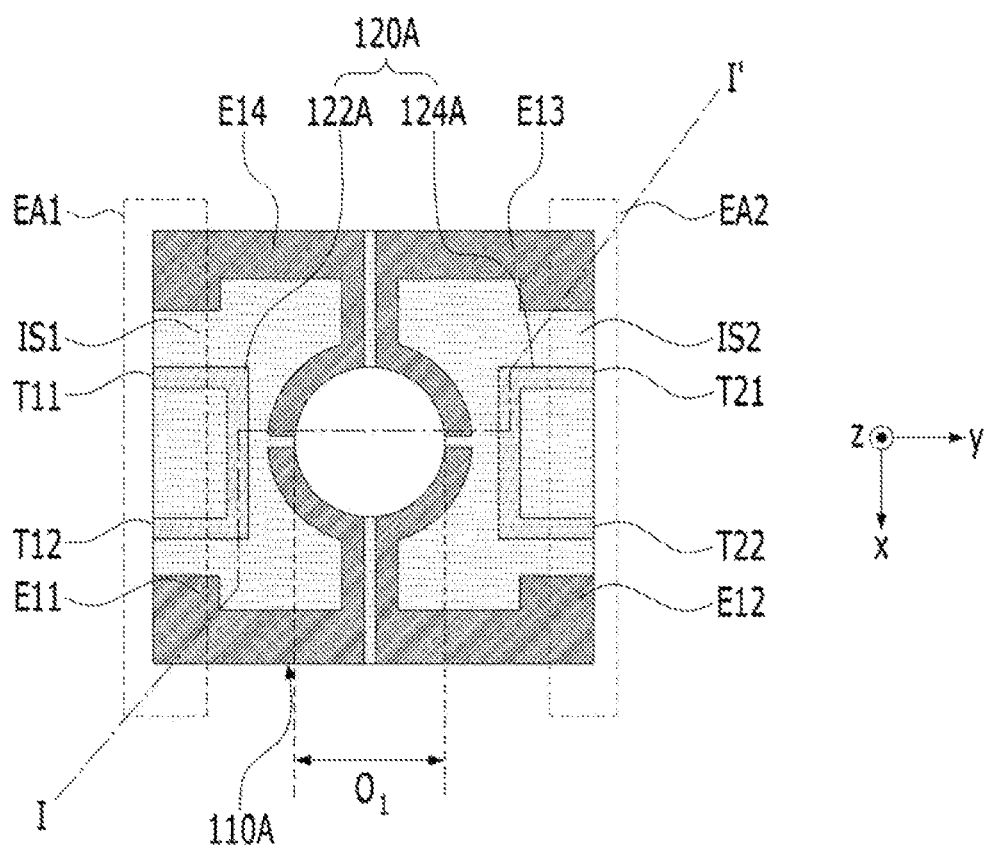

[FIG. 6]
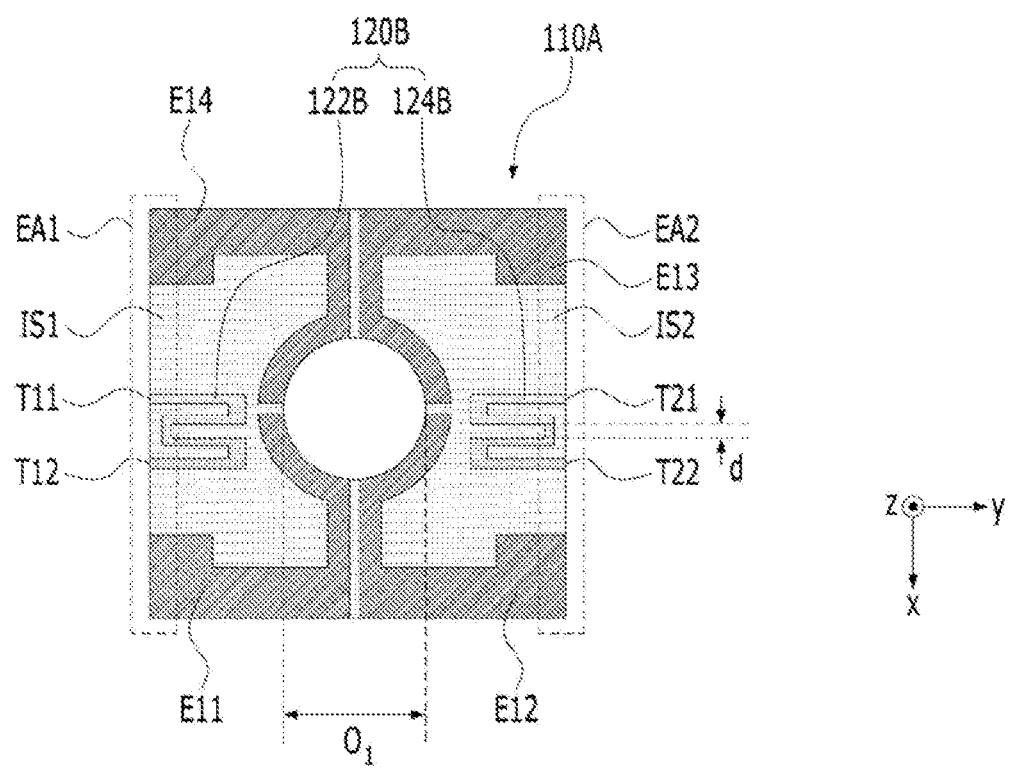

[FIG. 7]
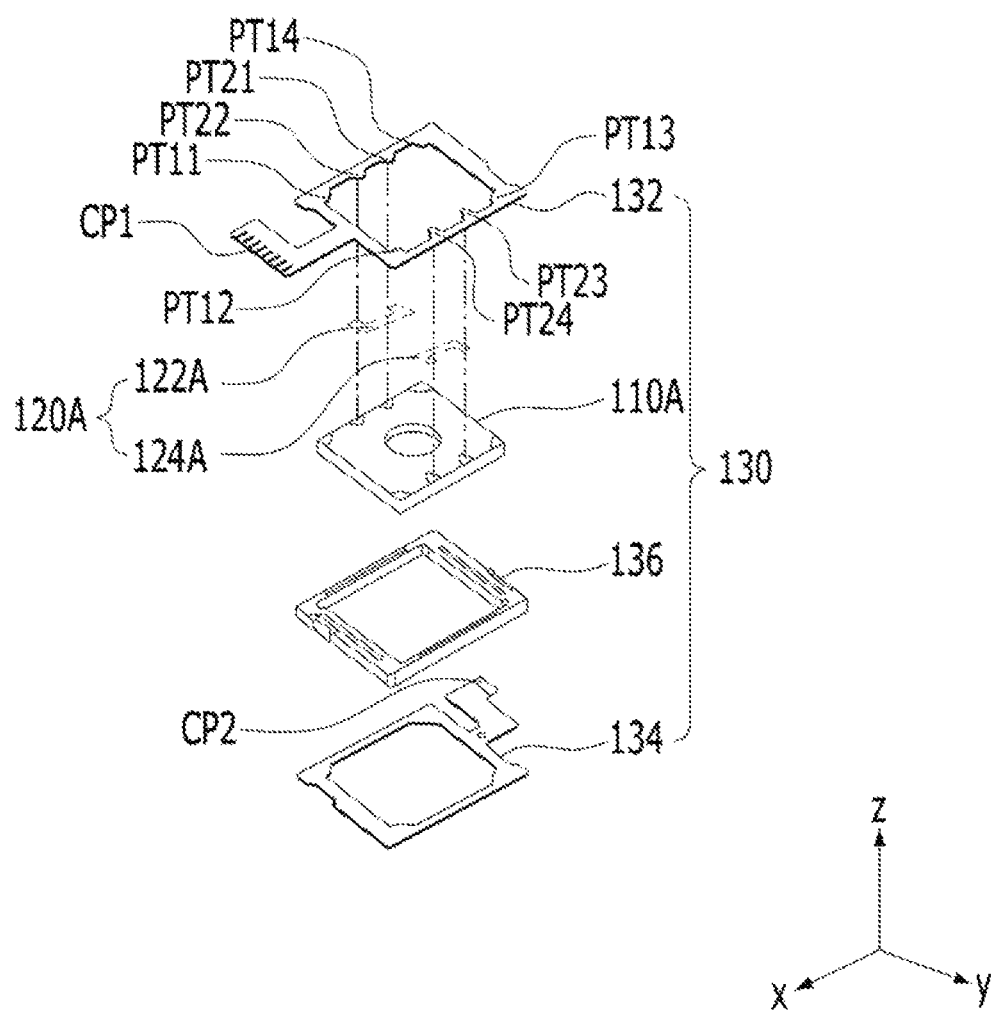

[FIG. 8]
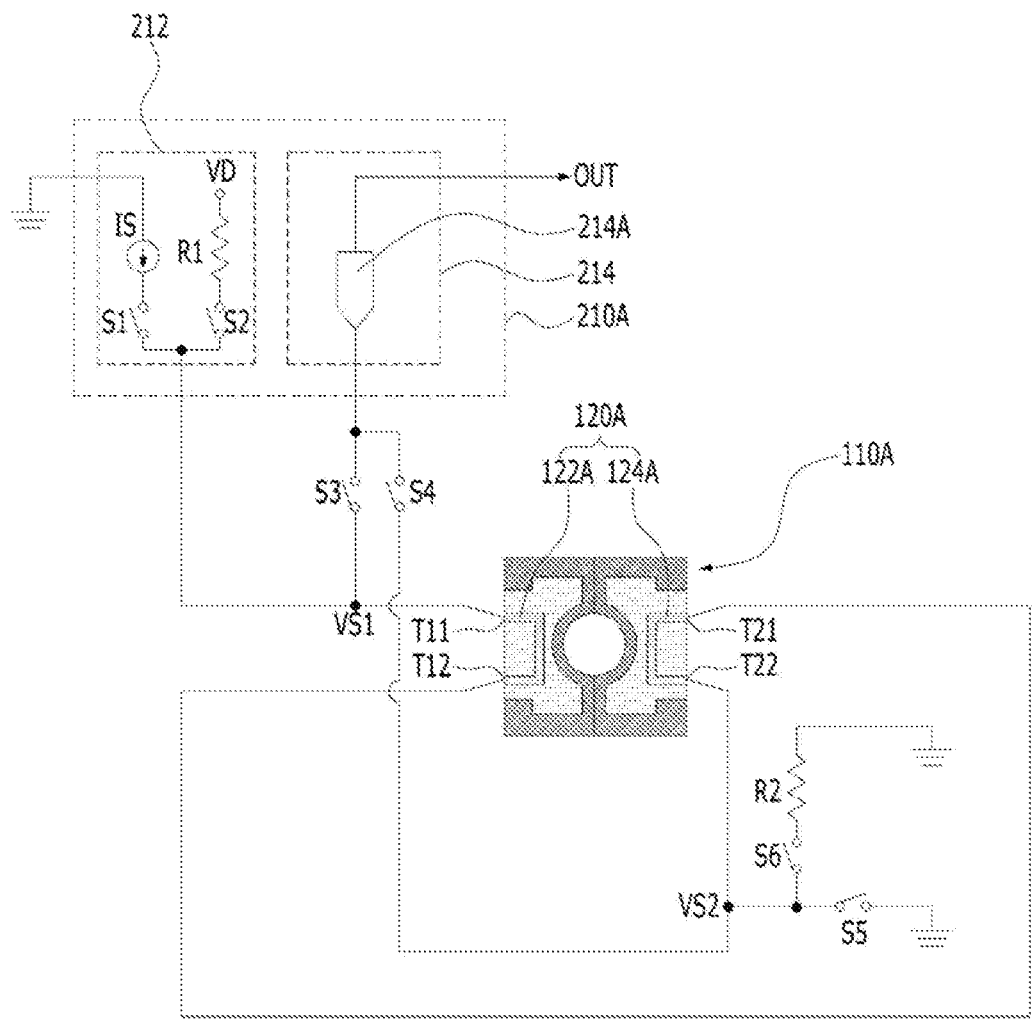

[FIG. 9]
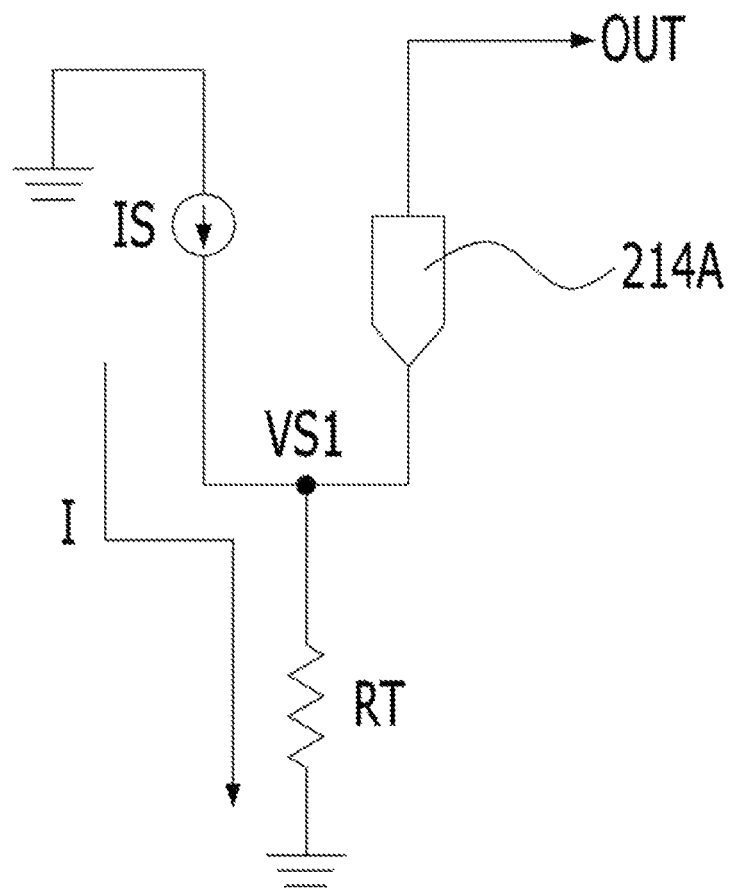

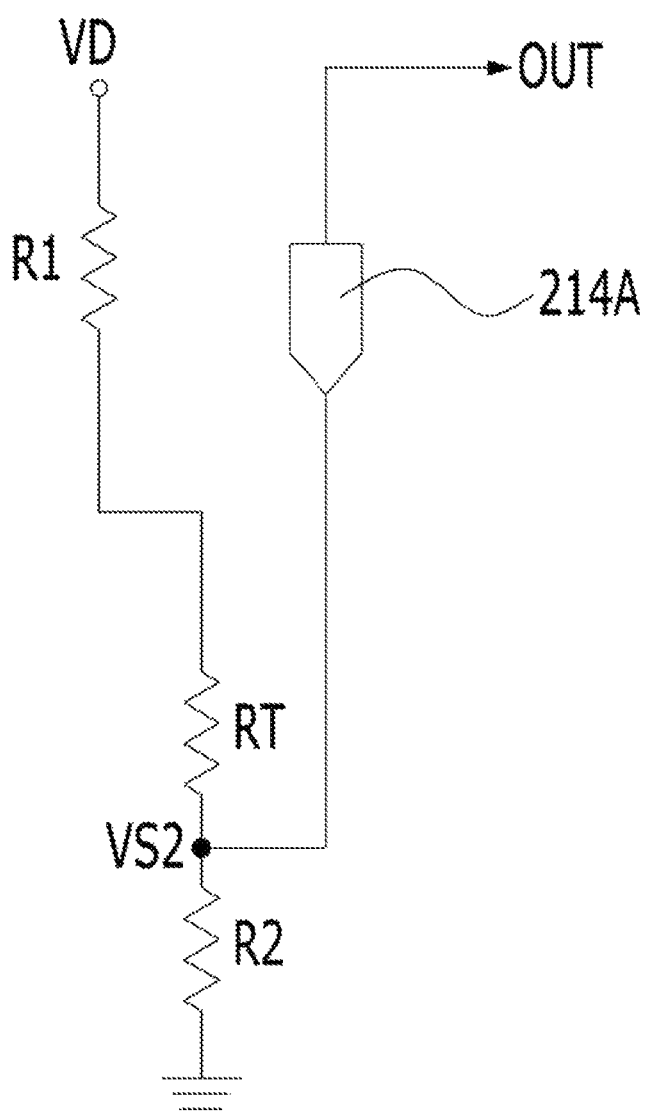
[FIG. 10]

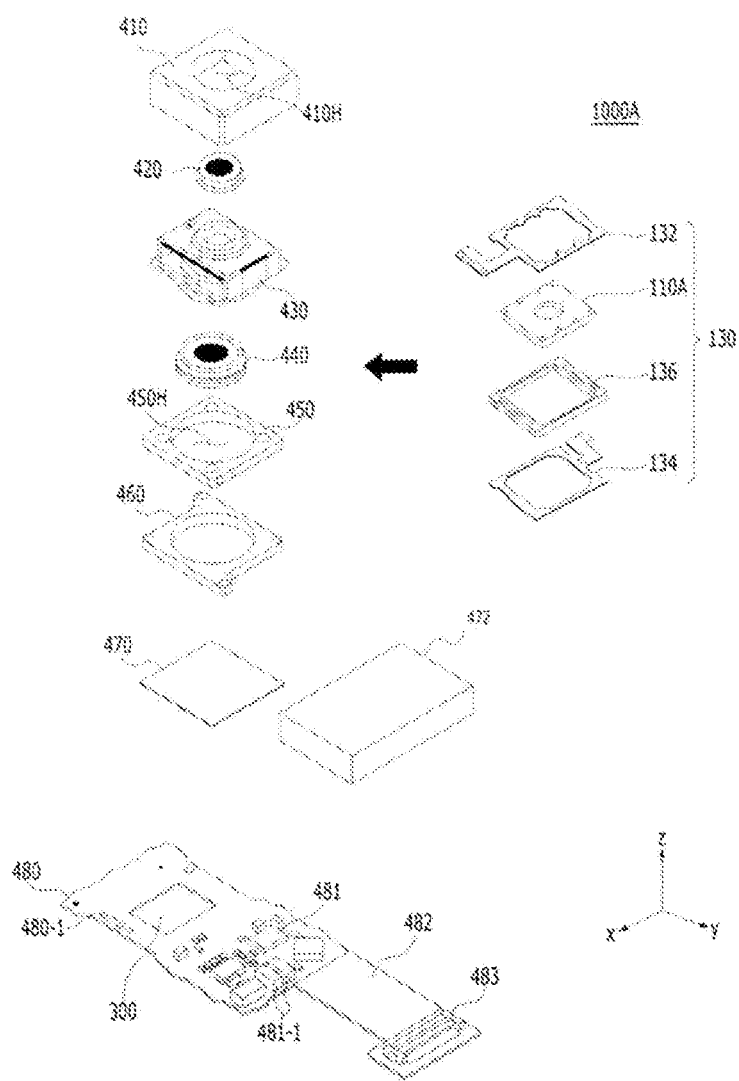
[FIG. 11]

[FIG. 12]
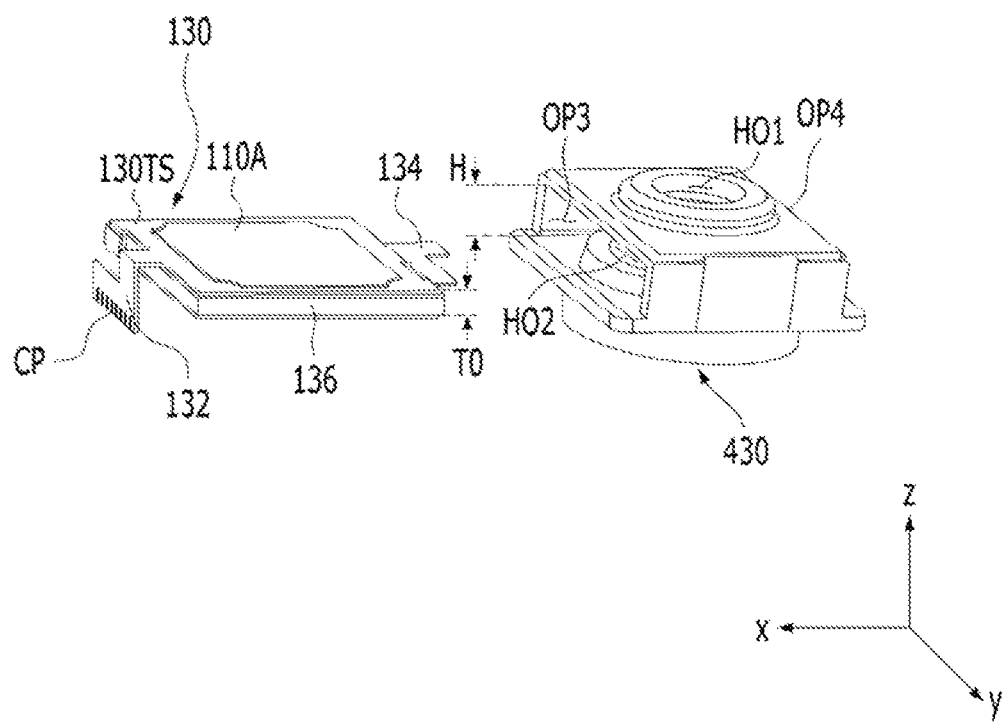

[FIG. 13]
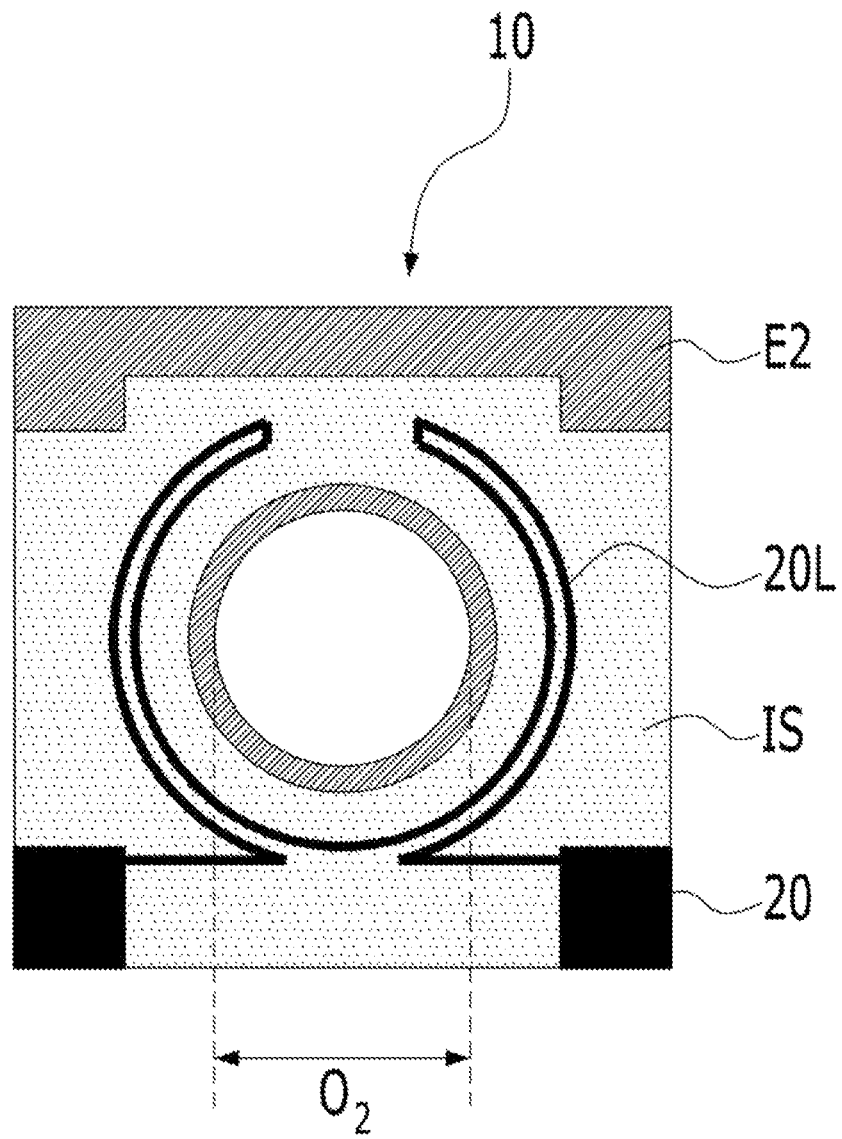

CAMERA MODULE INCLUDING LIQUID LENS

CROSS REFERENCE TO RELATED APPLICATIONS

This application is the National Phase of PCT/KR2019/017682 filed on Dec. 13, 2019, which claims priority under 35 U.S.C. § 119(a) to Patent Application No. 10-2018-0164475 filed in the Republic of Korea on Dec. 18, 2018, all of which are hereby expressly incorporated by reference into the present application.

Technical Field

Embodiments relate to a camera module including a liquid lens.

Background Art

People who use portable devices demand optical devices that have high resolution, are small, and have various photographing functions. For example, these various photographing functions may be at least one of an optical zoom-in/zoom-out function, an auto-focusing (AF) function, or a hand-tremor compensation or optical image stabilization (OIS) function.

In the conventional art, in order to implement the various photographing functions described above, a method of combining a plurality of lenses and directly moving the combined lenses is used. In the case in which the number of lenses is increased, however, the size of the optical device may increase.

The auto-focusing and hand-tremor compensation functions are performed by moving or tilting a plurality of lenses, which are secured to a lens holder and are aligned along an optical axis, in an optical-axis direction or a direction perpendicular to the optical axis. To this end, a separate lens-moving apparatus is required in order to move a lens assembly composed of a plurality of lenses. However, the lens-moving apparatus has high power consumption, and an additional cover glass needs to be provided separately from a camera module in order to protect the lens-moving apparatus, thus causing a problem in that the overall size of the conventional camera module is increased. In order to solve this, studies have been conducted on a liquid lens that performs auto-focusing and hand-tremor compensation functions by electrically adjusting the curvature and tilting of an interface between two types of liquids.

DISCLOSURE

Technical Problem

Embodiments provide a camera module including a liquid lens that is capable of sensing the temperature of the liquid lens.

The objects to be accomplished by the embodiments are not limited to the above-mentioned objects, and other objects not mentioned herein will be clearly understood by those skilled in the art from the following description.

Technical Solution

A camera module according to an embodiment may include a liquid lens, a first plate and an including individual electrode disposed on a first surface of the first plate, a plurality of temperature detection elements disposed on the first surface of the first plate so as to be spaced apart from the individual electrode, and a temperature sensor connected to the plurality of temperature detection elements to sense the temperature of the liquid lens, wherein the plurality of temperature detection elements may include first and second temperature detection elements spaced apart from each other, the temperature sensor may be connected to one end of the first temperature detection element, the opposite end of the first temperature detection element may be connected to one end of the second temperature detection element, and the opposite end of the second temperature detection element may be connected to a reference potential.

For example, the camera module may include a connection substrate connected to the individual electrode, an image sensor, and a main board on which the image sensor is mounted, and the temperature sensor may be disposed on the main board.

For example, the opposite end of the first temperature detection element and the one end of the second temperature detection element may be connected to each other via the main board.

For example, the one end and the opposite end of the first temperature detection element may be disposed in a first edge area of the liquid lens, and the one end and the opposite end of the second temperature detection element may be disposed in a second edge area of the liquid lens, the second edge area being opposite the first edge area.

For example, the first temperature detection element and the second temperature detection element may be disposed so as to face each other, with the center of the liquid lens interposed therebetween.

For example, the first and second temperature detection elements may have the same resistance value.

For example, the temperature sensor may include a sensing driver, configured to supply a driving signal to the one end of the first temperature detection element, and a temperature information measurer, connected to the one end of the first temperature detection element to measure temperature information of the plurality of temperature detection elements.

For example, the first plate may include a second surface formed opposite the first surface, and the area of the first surface may be larger than the area of the second surface.

For example, each of the first temperature detection element and the second temperature detection element may include a resistor or a thermistor, the value of which changes with changes in temperature.

For example, the sensing driver may supply the driving signal in the form of current or in the form of voltage.

Advantageous Effects

According to a camera module including a liquid lens according to the embodiments, since first and second temperature detection elements are disposed on both sides of the liquid lens, the lengths of lines of the temperature detection elements are not required to be long, and the interval between the lines may be increased, whereby the lines of the temperature detection elements are less likely to be deformed by heat, structural design thereof may be simplified, and a manufacturing process may be facilitated.

In addition, according to a camera module including a liquid lens according to the embodiments, since temperature detection elements are disposed on the wider surface among the upper surface and the lower surface of a first plate, it may not be necessary to increase the area of the liquid lens in order to install the temperature detection elements, and the temperature detection elements and a common electrode may be prevented from being short-circuited, thereby exhibiting excellent electrical characteristics.

In addition, since a camera module including a liquid lens according to the embodiments is provided with a plurality of temperature detection elements, there may be less limitation on the range within which the resistance value necessary for the operation of the temperature detection elements and the amount of change thereof can be adjusted.

However, the effects achievable through the embodiments are not limited to the above-mentioned effects, and other effects not mentioned herein will be clearly understood by those skilled in the art from the following description.

DESCRIPTION OF DRAWINGS

FIG. 1 is a schematic block diagram of a camera module according to an embodiment.

FIG. 2 is a perspective view of embodiments of the liquid lens and the temperature detection element shown in FIG. 1.

FIG. 3 is a cross-sectional view taken along line I-I' in FIG. 2.

FIG. 4 shows an equivalent circuit of the liquid lens shown in FIG. 2.

FIG. 5 is a view for explaining the planar shape of an embodiment of the temperature detection element shown in FIG. 1.

FIG. 6 is a view for explaining the planar shapes of another embodiment of the temperature detection element shown in FIG. 1.

FIG. 7 is a perspective view of a liquid lens module according to an embodiment.

FIG. 8 is a diagram for explaining the operation of the camera module shown in FIG. 1.

FIG. 9 shows an equivalent circuit of the camera module shown in FIG. 8 when a driving signal is supplied in the form of current.

FIG. 10 shows an equivalent circuit of the camera module shown in FIG. 8 when a driving signal is supplied in the form of voltage.

FIG. 11 is an exploded perspective view of an embodiment of the camera module shown in FIG. 1.

FIG. 12 is a view for explaining the holder and the liquid lens module shown in FIG. 11.

FIG. 13 is a partial plan view of a camera module according to a comparative example.

[Best Mode]

Hereinafter, exemplary embodiments of the present disclosure will be described in detail with reference to the accompanying drawings.

The technical spirit of the disclosure is not limited to the embodiments to be described, and may be implemented in various other forms, and one or more of the components may be selectively combined and substituted for use without exceeding the scope of the technical spirit of the disclosure.

In addition, terms (including technical and scientific terms) used in the embodiments of the disclosure, unless specifically defined and described explicitly, are to be interpreted as having meanings that may be generally understood by those having ordinary skill in the art to which the disclosure pertains, and meanings of terms that are commonly used, such as terms defined in a dictionary, should be interpreted in consideration of the context of the relevant technology.

Further, the terms used in the embodiments of the disclosure are for explaining the embodiments and are not intended to limit the disclosure. In this specification, the singular forms may also include plural forms unless otherwise specifically stated in a phrase, and in the case in which "at least one (or one or more) of A, B, or C" is stated, it may include one or more of all possible combinations of A, B, and C.

In addition, in describing the components of the embodiments of the disclosure, terms such as "first", "second", "A", "B", "(a)", and "(b)" can be used. Such terms are only for distinguishing one component from another component, and do not determine the nature, sequence or procedure etc. of the corresponding constituent elements.

In addition, when it is described that a component is "connected", "coupled" or "joined" to another component, the description may include not only being directly "connected", "coupled" or "joined" to the other component but also being "connected", "coupled" or "joined" by another component between the component and the other component.

In addition, in the case of being described as being formed or disposed "above (on)" or "below (under)" another component, the description includes not only the case where the two components are in direct contact with each other, but also the case where one or more other components are formed or disposed between the two components. In addition, when expressed as "above (on)" or "below (under)", it may refer to a downward direction as well as an upward direction with respect to one element.

A variable lens may be a variable focus lens. Further, a variable lens may be a lens that is adjustable in focus. A variable lens may be at least one of a liquid lens, a polymer lens, a liquid crystal lens, a VCM type, or an SMA type. A liquid lens may include a liquid lens including one liquid and a liquid lens including two liquids. A liquid lens including one liquid may change the focus by adjusting a membrane disposed at a position corresponding to the liquid, for example, by pressing the membrane using the electromagnetic force between a magnet and a coil. A liquid lens including two liquids may include a conductive liquid and a non-conductive liquid, and may adjust the interface formed between the conductive liquid and the non-conductive liquid using voltage applied to the liquid lens. A polymer lens may change the focus by controlling a polymer material using a driver such as a piezo actuator. A liquid crystal lens may change the focus by controlling a liquid crystal using electromagnetic force. A VCM type may change the focus by adjusting a solid lens or a lens assembly including a solid lens using electromagnetic force between a magnet and a coil. An SMA type may change the focus by controlling a solid lens or a lens assembly including a solid lens using a shape memory alloy.

Hereinafter, a variable lens included in a camera module will be described as being a liquid lens, but the embodiments are not limited thereto.

Hereinafter, camera modules 1000 and 1000A including a liquid lens according to embodiments will be described with reference to the accompanying drawings. Although the camera modules 1000 and 1000A will be described using the Cartesian coordinate system (x-axis, y-axis, z-axis) for convenience of description, they may also be described using any of other coordinate systems. Although the x-axis, the y-axis, and the z-axis of the Cartesian coordinate system are perpendicular to each other, the embodiments are not limited thereto. That is, the x-axis, the y-axis, and the z-axis may intersect each other obliquely.

FIG. 1 is a schematic block diagram of a camera module 1000 according to an embodiment. Here, LX represents an optical axis.

The camera module 1000 shown in FIG. 1 may include a liquid lens 110, a temperature detection element 120, and a temperature sensor 210.

Although it is illustrated in FIG. 1 that the temperature detection element 120 belongs to a lens assembly 100, the embodiments are not limited thereto. That is, unlike what is shown in FIG. 1, the temperature detection element 120 may be a constituent element of the camera module 1000, rather than being a constituent element of the lens assembly 100. Further, the embodiments are not limited to any specific configuration of the lens assembly 100 in which the liquid lens 110 is included. An example of the lens assembly 100 will be described later with reference to FIG. 11.

FIG. 2 is a perspective view of embodiments 110A and 120A of the liquid lens 110 and the temperature detection element 120 shown in FIG. 1.

FIG. 3 is a cross-sectional view taken along line I-I' in FIG. 2.

The liquid lens 110A and the temperature detection element 120A shown in FIGS. 2 and 3, which will be described below, are merely given as examples for helping understand the liquid lens 110 and the temperature detection element 120 shown in FIG. 1. That is, the liquid lens 110 and the temperature detection element 120 shown in FIG. 1 may have various shapes different from those shown in FIGS. 2 and 3.

The liquid lens 110A shown in FIGS. 2 and 3 may include a plurality of different types of liquids LQ1 and LQ2, first to third plates P1, P2 and P3, first and second electrodes E1 and E2, and an insulation layer 116.

The liquid lens 110A may include a cavity CA. The plurality of liquids LQ1 and LQ2 may be accommodated in the cavity CA, and may include a first liquid LQ1, which is conductive, and a second liquid (or an insulative liquid) LQ2, which is non-conductive. The first liquid LO1 and the second liquid LQ2 may be immiscible with each other, and an interface BO may be formed at a contact portion between the first and second liquids LQ1 and LQ2. In an example, the second liquid LQ2 may be disposed on the first liquid LQ1, but the embodiments are not limited thereto.

In addition, in the cross-sectional shape of the liquid lens 110A, the edges of the first and second liquids LQ1 and LQ2 may be thinner than the center portions thereof.

The first liquid LQ1 may be a conductive material, and the second liquid LQ2 may be an insulative material, and for example, may be phenyl-based silicon oil.

The inner side surface of the first plate P1 may form a sidewall i of the cavity CA. The first plate P1 may include upper and lower openings having a predetermined inclined surface. That is, the cavity CA may be a through-hole area formed in the first plate P1.

As shown in FIG. 3, the area of the first opening in the direction in which light is introduced into the cavity CA may be smaller than the area of the second opening in the opposite direction. Alternatively, the liquid lens 110A may be disposed such that the direction of inclination of the cavity CA is opposite what is illustrated. That is, unlike the illustration of FIG. 3, the area of the second opening in the direction in which light is introduced into the cavity CA may be greater than the area of the first opening in the opposite direction. In addition, when the liquid lens 110A is disposed such that the direction of inclination of the cavity CA is opposite what is illustrated, the arrangement of all or some of the components included in the liquid lens 110A may be changed, or only the direction of inclination of the cavity CA may be changed and the arrangement of the remaining components may not be changed, according to the direction of inclination of the liquid lens 110A.

The diameter of the wider opening among the first and second openings may be set in consideration of the field of view (FOV) required for the liquid lens 110A or the role of the liquid lens 110A in the camera module 1000. According to the embodiment, the size (or the area or the width) of the second opening O2 may be greater than the size (or the area or the width) of the first opening O1. Here, the size of each of the first and second openings may be the cross-sectional area in the horizontal direction (e.g. the x-axis direction and the y-axis direction). For example, the size of each of the first and second openings may mean the radius when the opening has a circular cross-section, and may mean the diagonal length when the opening has a square cross-section.

Each of the first and second openings may take the form of a hole having a circular cross-section. The interface BO formed by the two liquids may be moved along the inclined surface of the cavity CA by a driving voltage.

The first liquid LQ1 and the second liquid LQ2 are charged, accommodated, or disposed in the cavity CA in the first plate P1. In addition, the cavity CA is a portion through which the light incident on the liquid lens 110A passes. Thus, the first plate P1 may be formed of a transparent material, or may include impurities so that light does not easily pass therethrough.

The multiple first electrodes E1 may be disposed so as to be spaced apart from the second electrode E2, and may be respectively disposed on a first surface SF1 (i.e. the upper surface), a side surface, and a second surface SF2 (i.e. the lower surface) of the first plate P1. The second electrode E2 may be disposed on at least a portion of the second surface SF2 of the first plate P1, and may be in direct contact with the first liquid LQ1.

Referring to FIG. 3, if the area of the top of the first plate P1 and the area of the bottom thereof are the same as each other before the first and second openings are formed, since the first opening has a smaller area than the second area as described above, the area of the first surface SF1 around the first opening in the first plate P1 is larger than the area of the second surface SF2 around the second opening in the first plate P1.

In addition, the first electrodes E1 may be "n" electrodes (hereinafter referred to as Windividual electrodes"), and the second electrode E2 may be a single electrode (hereinafter referred to as a "common electrode"). Here, "n" is a positive integer of 2 or greater.

Hereinafter, the case in which n=4, i.e. in which the first electrodes E1 include four individual electrodes E11, E12, E13 and E14, will be described, but the embodiments are not limited thereto.

A portion of the second electrode E2 disposed on the second surface SF2 of the first plate P1 may be exposed to the first liquid LO1, which is conductive.

Each of the first and second electrodes E1 and E2 may be formed of a conductive material, e.g. metal.

In addition, the second plate P2 may be disposed on one surface of each of the first electrodes E1. That is, the second plate P2 may be disposed above the first surface SF1 of the first plate P1. Specifically, the second plate P2 may be disposed on the upper surfaces of the first electrodes E1 and the cavity CA.

The third plate P3 may be disposed on one surface of the second electrode E2. That is, the third plate P3 may be disposed below the second surface SF2 of the first plate P1. Specifically, the third plate P3 may be disposed under the lower surface of the second electrode E2 and the cavity CA.

The second plate P2 and the third plate P3 may be disposed so as to face each other, with the first plate P1 interposed therebetween. In addition, at least one of the second plate P2 or the third plate P3 may be omitted.

At least one of the second plate P2 or the third plate P3 may have a rectangular planar shape. The third plate P3 may be brought into contact with and bonded to the first plate P1 on a bonding area around the edge thereof.

Each of the second and third plates P2 and P3 may be an area through which light passes, and may be formed of a light-transmissive material. For example, each of the second and third plates P2 and P3 may be formed of glass, and, for convenience of processing, may be formed of the same material.

The second plate P2 may be configured to allow the light incident on the liquid lens 110A to travel into the cavity CA in the first plate P1.

The third plate P3 may be configured to allow the light that has passed through the cavity CA in the first plate P1 to be emitted from the liquid lens 110A. The third plate P3 may be in direct contact with the first liquid LQ1.

According to the embodiment, the third plate P3 may have a diameter greater than the diameter of the wider opening among the first and second openings in the first plate P1. In addition, the third plate P3 may include a peripheral area spaced apart from the first plate P1.

The insulation layer 116 may be disposed so as to cover a portion of the lower surface of the second plate P2 in the upper area of the cavity CA. That is, the insulation layer 116 may be disposed between the second liquid L02 and the second plate P2.

In addition, the insulation layer 116 may be disposed so as to cover portions of the first electrodes E1 that form the sidewall of the cavity CA. In addition, the insulation layer 116 may be disposed on the lower surface SF2 of the first plate P1 so as to cover portions of the first electrodes E1, a portion of the first plate P1, and a portion of the second electrode E2. Thus, contact between the first electrode E1 and the first liquid LQ1 and contact between the first electrode E1 and the second liquid L02 may be prevented by the insulation layer 116. The insulation layer 116 may cover one electrode among the first and second electrodes E1 and E2 (e.g. the first electrodes E1), and may expose a portion of the other electrode (e.g. the second electrode E2) so that electrical energy is applied to the first liquid LQ1, which is conductive.

FIG. 4 illustrates an equivalent circuit of the liquid lens 110A shown in FIG. 2.

The operation of the liquid lens 110A will be described below with reference to FIGS. 2 and 4.

The liquid lens 110A, the interface BO of which is adjusted in shape in response to a driving voltage, may receive the driving voltage via multiple first electrodes E1: E11, E12, E13 and E14, which are disposed in four different directions at the same angular interval, and the second electrode E2: CO. When the driving voltage is applied via any one of the multiple first electrodes E1: E11, E12, E13 and E14 and the second electrode E2: CO, the shape of the interface BO between the first liquid LQ1 and the second liquid LQ2, which are disposed in the cavity CA, may be deformed. The degree of deformation and the shape of the interface BO between the first liquid LQ1 and the second liquid LQ2 may be controlled by the control circuit 200 in order to implement at least one of the AF function or the OIS function. That is, the control circuit 200 may generate a driving voltage to control the liquid lens 110A.

In addition, referring to FIG. 4, the liquid lens 110A may be conceptually explained as a plurality of capacitors CAP, in which one side of the liquid lens 110A receives voltages from the first electrodes E1: E11, E12, E13 and E14 and the other side of the liquid lens 110A is connected to the second electrode E2: CO to receive a voltage therefrom.

Meanwhile, in order to explain the concept of the camera module 1000 according to the embodiment, the temperature detection element 120 is illustrated in FIG. 1 as being spaced apart from the liquid lens 110. However, the temperature detection element 120 may be disposed inside the liquid lens 110. That is, according to the embodiment, the temperature detection element 120 shown in FIG. 1 may be spaced apart from the first electrodes E1: E11, E12, E13 and E14, which are individual electrodes, as shown in FIG. 2, and may be disposed on the first surface SF1 of the first plate P1, on which the first electrodes E1: E11, E12, E13 and E14, which are individual electrodes, are disposed, as shown in FIG. 3. Alternatively, the temperature detection element may be disposed on the first surface SF1, which is the wider surface among the first surface SF1 and the second surface SF2 of the first plate P1. As such, the temperature detection element 120 may be disposed on the same surface as the surface on which the individual electrodes are disposed, or may be disposed on the wider surface among the upper surface and the lower surface of the first plate P1.

According to the embodiment, the temperature detection element 120 may be provided in a plural number.

As shown in FIGS. 2 and 3, the temperature detection element 120: 120A according to an embodiment may include first and second temperature detection elements 122A and 124A, which are spaced apart from each other.

FIGS. 5 and 6 are views for explaining the planar shapes of various embodiments 120A and 120B of the temperature detection element 120 shown in FIG. 1.

FIG. 3 corresponds to a cross-sectional view taken along line I-I' in FIG. 5. For better understanding, an illustration of the second plate P2, which is shown in FIG. 3, is omitted from FIGS. 5 and 6.

According to an embodiment, as shown in FIGS. 2 and 5, the temperature detection element may be disposed on the first plate P1 in a predetermined pattern. For example, in the embodiment shown in FIG. 5, the first temperature detection element 122A may have a right-bracket planar shape, and the second temperature detection element 124A may have a left-bracket planar shape, but this is merely given by way of example. The temperature detection elements may be formed in any other pattern.

According to another embodiment, as shown in FIG. 6, each of the first and second temperature detection elements 122B and 124 of the temperature detection element 120B may have a serpentine planar shape.

FIGS. 2, 5 and 6 show exemplary planar shapes of the temperature detection elements 120A and 120B, but the embodiments are not limited thereto, and may provide various other planar shapes thereof.

Hereinafter, the first and second temperature detection elements 122A and 124A shown in FIG. 5 will be described. Except for the difference in the planar shape thereof, the following description may also apply to the first and second temperature detection elements 122B and 124B shown in FIG. 6, unless otherwise noted.

As shown in FIG. 3, the first and second temperature detection elements 122A and 124A may be disposed between the first surface SF1 of the first plate P1 and the second plate P2. Therefore, although the first and second temperature detection elements 122A and 124A are not visible from the outside, they are indicated by the dotted lines in FIG. 2 in order to promote an understanding of the embodiment.

Also, referring to FIG. 3, the first and second temperature detection elements 122A and 124A may be disposed on the first plate P1. A current may be supplied to the first and second temperature detection elements 122A and 124A in order to sense the temperature of the liquid lens 110A, which will be described later with reference to FIG. 8. In this case, when the first and second temperature detection elements 122A and 124A are disposed on the first electrodes E1 without interposing insulation layers IS1 and IS2 therebetween, the first electrodes E1 and the first and second temperature detection elements 122A and 124A may be short-circuited. In order to prevent this, the insulation layers IS1 and IS2 are disposed between the first electrodes E1 and the first and second temperature detection elements 122A and 124A in order to electrically separate these components E1, 122A and 124A from each other, thereby preventing these components E1, 122A and 124A from being short-circuited. An air layer, a glass layer, which is generated due to fusion of the first plate P1 and the second plate P2, or another insulation member may be disposed as the insulation layers IS1 and IS2, or the insulation layers IS1 and IS2 may be formed of the same material as that of the insulation layer 116 shown in FIG. 3.

As illustrated in FIG. 5, the first temperature detection element 122A and the second temperature detection element 124A may be disposed so as to face each other, with the center of the liquid lens 110A interposed therebetween. Similarly, as illustrated in FIG. 6, the first temperature detection element 122B and the second temperature detection element 124B may be disposed so as to face each other, with the center of the liquid lens 110A interposed therebetween.

In addition, as shown in FIG. 5, the first temperature detection element 122A and the second temperature detection element 124 may have planar shapes, which are symmetric to each other with respect to a surface that is perpendicular to the y-axis direction, is parallel to the x-axis and the z-axis, and passes through the center of the liquid lens 110A, but the embodiments are not limited thereto.

In the first temperature detection element 122A and the second temperature detection element 124A shown in FIG. 5, the amounts of change in the resistance value according to a change in the temperature of the liquid lens 110A may be the same as each other. To this end, the resistance value of the first temperature detection element 122A and the resistance value of the second temperature detection element 124A may be the same as each other.

Similarly, in the first temperature detection element 122B and the second temperature detection element 124B shown in FIG. 6, the amounts of change in the resistance value according to a change in the temperature of the liquid lens 110A may be the same as each other. To this end, the resistance value of the first temperature detection element 122B and the resistance value of the second temperature detection element 124B may be the same as each other.

For example, the first temperature detection elements 122A and 122B and the second temperature detection elements 124A and may be implemented as a resistor or a thermistor, the value of which changes with changes in temperature.

Meanwhile, referring again to FIG. 1, the temperature sensor 210 may be connected to the temperature detection element 120 to sense information on the temperature of the liquid lens 110 and to output the sensed temperature information through an output terminal OUT. The temperature sensor 210 may be included in the control circuit 200, but the embodiments are not limited to any specific configuration of the control circuit 200 in which the temperature sensor 210 is included. For example, the temperature sensor 210 may be disposed on a connection substrate, which electrically connects the control circuit 200 to the liquid lens.

The control circuit 200, which is capable of performing the function of the temperature sensor 210, may also serve to supply a driving voltage (or an operation voltage) to the liquid lens 110. The control circuit 200 and the image sensor 300 may be mounted on a single main board, for example, a printed circuit board (PCB), but this is merely given by way of example, and the embodiments are not limited thereto. That is, the temperature sensor 210 may be disposed on the main board. The control circuit 200 may correspond to the main board 480 shown in FIG. 11, to be described later.

The image sensor 300 may perform a function of converting the light that has passed through the liquid lens 110 of the lens assembly 100 into image data. More specifically, the image sensor 300 may generate image data by converting light into analog signals via a pixel array including a plurality of pixels and synthesizing digital signals corresponding to the analog signals.

When the camera module 1000 according to the embodiment is applied to an optical device (or an optical instrument), the configuration of the control circuit 200 may be designed in different ways depending on the specifications of the optical device. In particular, the control circuit 200 may be implemented as a single chip so as to reduce the magnitude of the driving voltage that is applied to the lens assembly 100. Thereby, the size of an optical device mounted in a portable device may be further reduced.

The liquid lens 100: 110A and the temperature detection element 120: 120A and 120B shown in FIGS. 1, 2, 3, 5 and 6 may be modularized. Hereinafter, the modularized liquid lens 110 or 110A will be referred to as a "liquid lens module", and a liquid lens module 130 will be described below with reference to FIG. 7.

FIG. 7 is a perspective view of the liquid lens module 130 according to an embodiment.

Although the first and second temperature detection elements 122A and 124A are embedded in the liquid lens 110A and are visible from the outside, they are illustrated in FIG. 7 as being located outside the liquid lens 110A in order to help understand the connection relationships between a first connection substrate 132 and the first and second temperature detection elements 122A and 124A.

FIG. 7 is a plan view showing the state before a first connection substrate 132 and a second connection substrate 134 are bent in the −z-axis direction.

The liquid lens module 130 may include a first connection substrate 132, a liquid lens 110A, a temperature detection element 120A, and a second connection substrate 134. The liquid lens 110 and the temperature detection element 120 according to the embodiment are not limited to any specific configuration of the liquid lens module 130 to be described below.

Also, the temperature detection element 120A shown in FIG. 7 may be replaced with the temperature detection element 120B shown in FIG. 6. That is, the liquid lens module 130 may include the temperature detection element 120B shown in FIG. 6, rather than the temperature detection element 120A shown in FIG. 5. Since the liquid lens 110A and the temperature detection element 120A shown in FIG. 7 respectively correspond to the liquid lens 110A and the temperature detection element 120A shown in FIGS. 2, 3 and 5, the same: reference numerals are used, and a duplicate description thereof is omitted.

The first connection substrate 132 may electrically connect the multiple first electrodes E1: E11, E12, E13 and E14 included in the liquid lens 110A to the main board including the control circuit 200, and may be disposed on the liquid lens 110A. In addition, the first connection substrate 132 may electrically connect the temperature detection element 120A to the main board.

The first connection substrate 132 and the temperature detection element 120A may be electrically connected to each other in any of various forms. An example thereof will be described below with reference to FIGS. 2, 3, and 5 to 7, but the embodiments are not limited thereto.

As shown in FIG. 3, in order to electrically connect the first electrodes E1 (e.g. E11 and E13) to the first connection substrate 132, the second plate P2 exposes portions of the first electrodes E1. Similarly, the second plate P2 may expose end portions of the temperature detection element 120: 120A and 120B. To this end, the second plate P2 of the liquid lens 110A shown in FIG. 2 has therein first to fourth recesses H1 to H4. Referring to FIGS. 2, 5 and 6, the first recess H1 exposes one end T11 of the first temperature detection element 122A or 122B, the second recess H2 exposes the opposite end T12 of the first temperature detection element 122A or 122B, the third recess H3 exposes one end T21 of the second temperature detection element 124A or 124B, and the fourth recess H4 exposes the opposite end T22 of the second temperature detection element 124A or 124B.

Referring to FIGS. 5 and 6, the liquid lens 110A may include first and second edge areas EA1 and EA2. The first edge area EA1 may be an area that faces the second edge area EA2, with the center of the liquid lens 110A interposed therebetween. That is, the second edge area EA2 may be an area that is opposite the first edge area EA1.

One end T11 and the opposite end T12 of the first temperature detection element 122A or 122B may be disposed in the first edge area EA1 of the liquid lens 110A, and one end T21 and the opposite end T22 of the second temperature detection element 124A or 124B may be disposed in the second edge area EA2 of the liquid lens 110A.

Referring again to FIG. 7, the first connection substrate 132 may include first protruding portions P11 to P14, which protrude from the inner corners thereof toward the liquid lens 110A and are respectively electrically or physically connected to the four first electrodes E11, E12, E13 and E14. Among the first protruding portions, the 1-1st protruding portion P11 may be electrically or physically connected to the 1-1st electrode E11, the 1-2nd protruding portion P12 may be electrically or physically connected to the 1-2nd electrode E12, the 1-3rd protruding portion P13 may be electrically or physically connected to the 1-3rd electrode E13, and the 1-4th protruding portion P14 may be electrically or physically connected to the 1-4th electrode E14.

In addition, the first connection substrate 132 may include second protruding portions P21 to P24, which protrude from the inner edge surfaces between the inner corners thereof toward the liquid lens 110A. Among the second protruding portions, the 2-1st protruding portion P21 is electrically or physically connected to one end T11 of the first temperature detection element 122A or 122B, which is exposed through the first recess H1. The 2-2nd protruding portion P22 is electrically or physically connected to the opposite end T12 of the first temperature detection element 122A or 122B, which is exposed through the second recess H2. The 2-3rd protruding portion P23 is electrically or physically connected to one end T21 of the second temperature detection element 124A or 124B, which is exposed through the third recess H3. The 2-4th protruding portion P24 may be electrically or physically connected to the opposite end T22 of the second temperature detection element 124A or 124B, which is exposed through the fourth recess H4.

The first connection substrate 132 may include a connection pad CP1, which is electrically connected to the four first protruding portions PT11 to P14 and the four second protruding portions P21 to P24. The connection pad CP1 of the first connection substrate 132 may be electrically connected to an electrode pad (not shown), which is formed on the main board (e.g. 480 shown in FIG. 11) of the control circuit 200. To this end, after the first connection substrate 132 is bent in the −z-axis direction toward the main board, the connection pad CP1 and the electrode pad may be electrically connected to each other via conductive epoxy.

In addition, the first connection substrate 132 may be implemented as a flexible printed circuit board (FPCB).

The second connection substrate 134 may electrically connect the second electrode E2 included in the liquid lens 110A to the main board (e.g. 480 shown in FIG. 11), and may be disposed below the liquid lens 110A. The second connection substrate 134 may be implemented as an FPCB or a single metal substrate (a conductive metal plate).

The second connection substrate 134 may be electrically connected to the electrode pad, which is formed on the main board, via a connection pad CP2, which is electrically connected to the second electrode E2. To this end, the second connection substrate 134 may be bent in the −z-axis direction toward the main board 200.

The liquid lens module 130 according to the embodiment may further include a spacer 136.

The spacer 136 may have a ring shape, and may be disposed between the first connection substrate 132 and the second connection substrate 134 so as to surround the side surface of the liquid lens 110A, thereby protecting the liquid lens 110A from external impacts. To this end, the spacer 136 may have a shape that allows the liquid lens 110A to be mounted in, seated in, in contact with, fixed to, provisionally fixed to, supported by, coupled to, or disposed in the spacer.

Hereinafter, an example in which the temperature sensor 210 senses the temperature of the liquid lens 110 or 110A using the temperature detection element 120: 120A and 120B will be described with reference to the accompanying drawings. Although it will be described that the temperature of the liquid lens 110 or 110A is sensed using the temperature detection element 120A shown in FIG. 5, the following description may also apply to the case in which the temperature of the liquid lens 110 or 110A is sensed using the temperature detection element 120B shown in FIG. 6.

FIG. 8 is a diagram for explaining the operation of the camera module 1000 shown in FIG. 1.

A temperature sensor 210A shown in FIG. 8 corresponds to an embodiment of the temperature sensor 210 shown in FIG. 1.

The temperature sensor 210A may be connected to one end T11 of the first temperature detection element 122A. To this end, one end T11 of the first temperature detection element 122A may be electrically connected to the temperature sensor 210A, which is disposed on the main board (e.g. 480 shown in FIG. 11), via the first connection substrate 132.

In addition, the opposite end T12 of the first temperature detection element 122A may be connected to one end T21 of the second temperature detection element 124A. To this end, the opposite end T12 of the first temperature detection element 122A and one end T21 of the second temperature detection element 124A may be connected to each other via the first connection substrate 132, or may be connected to each other via the first connection substrate 132 and the main board.

The opposite end T22 of the second temperature detection element 124A may be connected to a reference potential (e.g. ground). To this end, the opposite end T22 of the second temperature detection element 124A may be connected to the reference potential via the first connection substrate 132 or via the first connection substrate 132 and the main board.

According to the embodiment, the temperature sensor 210A may include a sensing driver 212 and a temperature information measurer 214.

The sensing driver 212 serves to supply a driving signal to the first temperature detection element 122A. For example, the sensing driver 212 may supply a driving signal through one end T11 of the first temperature detection element 122A. The driving signal supplied from the sensing driver 212 may be a current type or a voltage type.

According to an embodiment, when the sensing driver 212 supplies a current-type driving signal, the sensing driver 212 may include a current source IS in FIG. 8.

According to another embodiment, when the sensing driver 212 supplies a voltage-type driving signal, the sensing driver 212 may include a supply voltage VD and a first resistor R1 in FIG. 8.

According to still another embodiment, when the sensing driver 212 selectively supplies a current-type driving signal or a voltage-type driving signal, the sensing driver 212 may include first and second switches S1 and S2 in addition to the current source IS, the supply voltage VD, and the first resistor R1, and the camera module 1000 may further include third to sixth switches S3 to S6 and a resistor R2.

Turn-on and turn-off operations of the first to sixth switches S1 to S6 may be controlled by the main board of the control circuit 200 shown in FIG. 1. To this end, the control circuit 200 may generate and output switch control signals for turning on or off the first to sixth switches S1 to S6.

The first switch S1 may be disposed between the constant current source IS and one end T11 of the first temperature detection element 122A, and the second switch S2 may be disposed between the resistor R1 and one end T11 of the first temperature detection element 122A.

The third switch 3 may be disposed between the temperature information measurer 214 and one end T11 of the first temperature detection element 122A, and the fourth switch S4 may be disposed between the temperature information measurer 214 and the opposite end T22 of the second temperature detection element 124A.

The fifth switch S5 may be disposed between the opposite end T22 of the second temperature detection element 124A and the reference potential (or ground), and the sixth switch S6 may be disposed between the opposite end T22 of the second temperature detection element 124A and the resistor R2.

The temperature information measurer 214 may be connected to the temperature detection element 120 to measure temperature information of the first and second temperature detection elements 122A and 124A.

For example, when the sensing driver 212 supplies a current-type driving signal, the temperature information measurer 214 may be connected to one end T11 of the first temperature detection element 122A to measure the temperature information of the first and second temperature detection elements 122A and 124A. To this end, the constant current source IS may be connected to one end T11 of the first temperature detection element 122A, and may supply a current-type driving signal to one end of the first temperature detection element 122A.

Alternatively, when the sensing driver 212 supplies a voltage-type driving signal, the temperature information measurer 214 may be connected to the opposite end T22 of the second temperature detection element 124A to measure the temperature information of the first and second temperature detection elements 122A and 124A. To this end, the first resistor (or load resistor) R1 may be disposed between the voltage-type driving signal and one end T11 of the first temperature detection element 122A1 to connect the same.

That is, the temperature information measurer 214 may measure the voltage VS1 at one end T11 of the first temperature detection element 122A or the voltage VS2 at the opposite end T22 of the second temperature detection element 124A, and may measure the temperature information of the first and second temperature detection elements 122A and 124A based on the measured voltage VS1 or VS2. To this end, the temperature information measurer 214 may include an analog/digital converter 214A. The analog/digital converter 214A may measure the voltage VS1 or VS2, may convert the measured voltage VS1 or VS2 into a digital form, and may output the result of conversion as temperature information through the output terminal OUT.

Hereinafter, the principle whereby the temperature information of the first and second temperature detection elements 122A and 124A is measured by the temperature sensor 210A will be described.

FIG. 9 shows an equivalent circuit of the camera module shown in FIG. 8 when a driving signal is supplied in the form of current.

First, the operation of the temperature information measurer 214 when the sensing driver 212 supplies a driving signal in the form of current will be described with reference to FIGS. 8 and 9.

The first, third and fifth switches S1, S3 and S5 are turned on, and the second, fourth and sixth switches S2, S4 and S6 are turned off. Accordingly, the camera module shown in FIG. 8 may realize electric connection as shown in FIG. 9.

Referring to FIG. 9, the current I output from the constant current source IS flows in the direction of the arrow. In this case, the voltage VS1 sensed by the temperature information measurer 214 is expressed using Equation 1 below.

$$VS1 = I \times RT \quad \text{[Equation 1]}$$

Here, RT represents the resistance value obtained by summing the resistance value RT1 of the first temperature detection element 122A and the resistance value RT2 of the second temperature detection element 124A.

The sensed voltage VS1 in Equation 1 is converted into a digital form by the analog/digital converter 214A, and is output as the temperature information of the first and second temperature detection elements 122A and 124A through the output terminal OUT.

The temperature of the first and second temperature detection elements 122A and 124A may be estimated using the temperature information output through the output terminal OUT. That is, in Equation 1, since the current I is a constant fixed value supplied from the constant current source IS, RT can be determined using VS1. If the first and second temperature detection elements 122A and 124A are implemented as negative thermistors having resistance values RT1 and RT2 that are inversely proportional to temperature, the resistance value RT decreases as the temperature increases. On the other hand, if the first and second temperature detection elements 122A and 124A are implemented as positive thermistors having resistance values RT1 and RT2 that are proportional to temperature, the resistance value RT increases as the temperature increases. In this way, the digital-type voltage VS1 output from the temperature sensor 214 through the output terminal OUT may be converted into the temperatures of the first and second temperature detection elements 122A and 124A.

FIG. 1 shows an equivalent circuit of the camera module shown in FIG. 8 when a driving signal is supplied in the form of voltage.

First, the operation of the temperature information measurer 214 when the sensing driver 212 supplies a driving signal in the form of voltage will be described with reference to FIGS. 8 and 10.

The second, fourth and sixth switches S2, S4 and S6 are turned on, and the first, third and fifth switches S1, S3 S5 are turned off. Accordingly, the camera module shown in FIG. 8 may realize electric connection as shown in FIG. 10.

Referring to FIG. 10, when a voltage-type driving signal is applied from the supply voltage VD through the resistor R1, the voltage VS2 at the opposite end T22 of the second temperature detection element 124A sensed by the temperature information measurer 214 is expressed using Equation 2 below.

$$VS2 = VD \cdot \frac{R2}{RT + R2} \quad \text{[Equation 2]}$$

Here, RT represents the resistance value obtained by summing the resistance values RT1 and RT2 as described above, VD represents the supply voltage, which is a fixed value, and R2 represents the external resistor, which has a fixed resistance value. In Equation 2, the value of the first resistor R1 is a negligible value, and thus is omitted. However, if the value of the first resistor R1 is applied, Equation 2 may be expressed as Equation 3 below.

$$VS2 = VD \cdot \frac{R2}{RT + R1 + R2} \quad \text{[Equation 3]}$$

The sensed voltage VS2 is converted into a digital form by the analog/digital converter 214A, and is output as the temperature information of the first and second temperature detection elements 122A and 124A through the output terminal OUT.

The temperatures of the first and second temperature detection elements 122A and 124A can be determined using the temperature information output through the output terminal OUT. In Equation 2, since the supply voltage VD and the value of the second resistor R2 are fixed values, RT can be determined using VS2. Alternatively, in Equation 3, since the supply voltage VD and the values of the resistors R1 and R2 are fixed values, RT can be determined using VS2.

If the first and second temperature detection elements 122A and 124A are implemented as negative thermistors having resistance values RT1 and RT2 that are inversely proportional to temperature, the resistance value RT decreases as the temperature increases. However, if the first and second temperature detection elements 122A and 124A are implemented as positive thermistors having resistance values RT1 and RT2 that are proportional to temperature, the resistance value RT increases as the temperature increases. In this way, the digital-type voltage VS2 output from the temperature sensor 214 through the output terminal OUT may be converted into the temperatures of the first and second temperature detection elements 122A and 124A.

The switches S1 to S6 of the camera module shown in FIG. 8 are turned on/off for respective operations as shown in Table 1 below.

TABLE 1

| Classification | OP1 | OP2 |
|---|---|---|
| S1 | 1 | 0 |
| S2 | 0 | 1 |
| S3 | 1 | 0 |
| S4 | 0 | 1 |
| S5 | 1 | 0 |
| S6 | 0 | 1 |

In Table 1, OP1 represents the switching operation of sensing the temperature of the liquid lens 110A when a current-type driving signal is applied thereto, and OP2 represents the switching operation of sensing the temperature of the liquid lens 110A when a voltage-type driving signal is applied thereto. In Table 1, "0" represents that a corresponding switch is in a turned-off state, and "1" represents that a corresponding switch is in a turned-on state.

Hereinafter, an embodiment of the camera module 1000 according to the above-described embodiment will be described with reference to FIGS. 11 and 12.

FIG. 11 is an exploded perspective view of an embodiment 1000A of the camera module 1000 shown in FIG. 1. Referring to FIG. 11, the camera module 1000A may include a lens assembly, an image sensor 300, and a main board 480. Here, the lens assembly, the image sensor 300, and the main board 480 respectively correspond to embodiments of the lens assembly, the image sensor 300, and the control circuit 200 shown in FIG. 1.

In addition, the camera module 1000A may further include a first cover 410 and a middle base 450. In addition, the camera module 1000A may further include a sensor base 460 and a filter 470. In addition, the camera module 1000A may further include a circuit cover 472. The circuit cover 472 may have an electromagnetic shielding function.

According to the embodiment, at least one of the components 420 to 470 of the camera module 1000A shown in FIG. 11 may be omitted. Alternatively, at least one component different from the components 420 to 470 shown in FIG. 11 may be further included in the camera module 1000A.

Referring to FIG. 11, the lens assembly may include at least one of a liquid lens module 130, a first lens unit 420, a holder 430, or a second lens unit 440, and may be disposed on a main board 480. One of the first lens unit 420 and the second lens unit 440 of the lens assembly may be omitted.

In the lens assembly, the first lens unit 420 and the second lens unit 440 may be respectively referred to as a "first solid lens unit" and a "second solid lens unit" in order to be distinguished from the liquid lens 110A.

The first lens unit 420 may be disposed at the upper side of the lens assembly, and may be a region on which light is incident from outside the lens assembly. That is, the first lens unit 420 may be disposed above the liquid lens module 130 within the holder 430. The first lens unit 420 may be implemented using a single lens, or may be implemented using two or more lenses that are aligned along a center axis to form an optical system. Here, the center axis may be the optical axis LX of the optical system, which is formed by the first lens unit 420, the liquid lens module 130, and the second lens unit 440 included in the camera module 1000A, or may be an axis parallel to the optical axis LX. The optical axis LX may correspond to the optical axis of the image sensor 300. That is, the first lens unit 420, the liquid lens module 130, the second lens unit 440, and the image sensor 300 may be aligned along the optical axis LX through active alignment (AA). Here, "active alignment" may mean an operation of aligning the optical axes of the first lens unit 420, the second lens unit 440, and the liquid lens module 130 with each other and adjusting the axial or distance relationships between the image sensor 300, the lens units 420 and 440, and the liquid lens module 130 in order to acquire an improved image.

FIG. 12 is a view for explaining the holder 430 and the liquid lens module 130 shown in FIG. 11. That is, FIG. 12 is an exploded perspective view of the holder 430 and the liquid lens unit 130. The holder 430 shown in FIG. 12 may include first and second holes HOT and HO2 and first to fourth sidewalls.

The first and second holes HOT and HO2 may be respectively formed in the upper portion and the lower portion of the holder 430 to open the upper portion and the lower portion of the holder 430, respectively. Here, the first hole HO1 and the second hole H02 may be through-holes. The first lens unit 420 may be accommodated in, mounted in, seated in, in contact with, fixed to, provisionally fixed to, supported by, coupled to, or disposed in the first hole HO1, which is formed in the holder 430, and the second lens unit 440 may be accommodated in, mounted in, seated in, in contact with, fixed to, provisionally fixed to, supported by, coupled to, or disposed in the second hole HO2, which is formed in the holder 430.

In addition, the first and second sidewalls of the holder 430 may be disposed so as to face each other in a direction perpendicular to the direction of the optical axis LX (e.g. in the x-axis direction), and the third and fourth sidewalls may be disposed so as to face each other in a direction perpendicular to the x-axis direction and to the direction of the optical axis LX (e. g. in the y-axis direction). In addition, as illustrated in FIG. 12, the first sidewall of the holder 430 may include a third opening OP3, and the second sidewall thereof may include a fourth opening OP4, having a shape that is the same as or similar to that of the third opening OP3. Thus, the third opening OP3 formed in the first sidewall and the fourth opening OP4 formed in the second sidewall may be disposed so as to face each other in a direction perpendicular to the direction of the optical axis LX (e.g. in the x-axis direction).

The inner space in the holder 430, in which the liquid lens module 130 is disposed, may be open due to the third and fourth openings OP3 and OP4. In this case, the liquid lens module 130 may be inserted through the third or fourth opening OP3 or OP4 so as to be mounted in, seated in, in contact with, fixed to, provisionally fixed to, supported by, coupled to, or disposed in the inner space in the holder 430. For example, the liquid lens module 130 may be inserted into the inner space in the holder 430 through the third opening OP3.

As such, in order to allow the liquid lens module 130 to be inserted into the inner space in the holder 430 through the third or fourth opening OP3 or OP4, the size of the third or fourth opening OP3 or OP4 in the holder 430 in the direction of the optical axis LX may be greater than the cross-sectional area of the liquid lens module 130 in the y-axis direction and the z-axis direction. For example, the height H corresponding to the size of each of the third and fourth openings OP3 and OP4 in the direction of the optical axis LX may be greater than the thickness TO of the liquid lens module 130.

The second lens unit 440 may be disposed below the liquid lens module 130 within the holder 430. The second lens unit 440 may be disposed so as to be spaced apart from the first lens unit 420 in the optical-axis direction (e.g. in the z-axis direction).

The light introduced into the first lens unit 420 from outside the camera module 1000A may pass through the liquid lens module 130 and may be introduced into the second lens unit 440. The second lens unit 440 may be implemented using a single lens, or may be implemented using two or more lenses, which are aligned along the center axis to form an optical system.

Unlike the liquid lens module 130, each of the first lens unit 420 and the second lens unit 440 may be a solid lens formed of glass or plastic, but the embodiments are not limited to any specific material of each of the first lens unit 420 and the second lens unit 440.

Referring again to FIG. 11, the first cover 410 may be disposed so as to surround the holder 430, the liquid lens module 130, and the middle base 450, and may protect these components 430, 130 and 450 from external impacts. In particular, since the first cover 410 is disposed, a plurality of lenses, which form the optical system, may be protected from external impacts.

In addition, in order to allow the first lens unit 420 disposed in the holder 430 to be exposed to external light, the first cover 410 may include an upper opening 410H formed in the upper surface of the first cover 410.

In addition, the first cover 410 may be disposed so as to cover the upper first to fourth sidewalls of the holder 430.

In addition, the middle base 450 may be disposed so as to surround the second hole HO2 in the holder 430. TO this end, the middle base 450 may include an accommodating hole 450H for accommodating the second hole HO2 therein.

In the same manner as the upper opening 410H in the first cover 410, the accommodating hole 450H may be formed near the center of the middle base 450 at a position corresponding to the position of the image sensor 300, which is disposed in the camera module 1000A.

The middle base 450 may be mounted on the main board 480 so as to be spaced apart from a circuit element 481 on the main board 480. That is, the holder 430 may be disposed on the main board 480 so as to be spaced apart from the circuit element 481.

The main board 480 may be disposed below the middle base 450, and may include a recess in which the image sensor 300 may be mounted, seated, tightly disposed, fixed, provisionally fixed, supported, coupled, or accommodated, the circuit element 481, a connection part (or an FPCB) 482, and a connector 483.

The circuit element 481 of the main board 480 may constitute a control module, which controls the liquid lens module 130 and the image sensor 300. The circuit element 481 may include at least one of a passive element and an active element, and may have any of various areas and heights. The circuit element 481 may be provided in a plural number, and may have a height greater than the height of the main board 480 so as to protrude outwards. The plurality of circuit elements 481 may be disposed so as not to overlap the holder 430 in the direction parallel to the optical axis LX. For example, the plurality of circuit elements 481 may include a power a inductor, gyro sensor, and the like, but the embodiments are not limited to any specific type of the circuit elements 481.

In addition, the circuit elements 481 may calculate the temperature of the temperature detection element 120 using the voltage values VS1 and VS2 output through the output terminal OUT shown in FIG. 1, and may transmit the calculated temperature to the outside through the connector 483. In addition, the circuit elements 481 may include the first to sixth switches S1 to S6 shown in FIG. 8, and may generate switch control signals to control the on/off operation of the switches S1 to S6.

The main board 480 may include a holder area in which the holder 430 is disposed and an element area in which the plurality of circuit elements 481 is disposed.

The main board 480 may be implemented as a rigid flexible printed circuit board (RFPCB) including the FPCB 482. The FPCB 482 may be bent depending on the requirement of the space in which the camera module 1000A is mounted.

Meanwhile, the connector 483 may electrically connect the main board 480 to a power supply or other devices (e.g. an application processor) outside the camera module 1000A.

Meanwhile, some of the plurality of circuit elements 481 shown in FIG. 11 may cause electromagnetic interference (EMI) or noise. In particular, among the plurality of circuit elements 481, a power inductor 481-1 may cause greater EMI than other elements. In order to block EMI or noise, the circuit cover 472 may be disposed so as to cover the circuit elements 481 disposed in the element area of the main board 480.

In addition, when the circuit cover 472 is disposed so as to cover the circuit elements 481, the circuit elements 481 disposed on the main board 480 may be protected from external impacts. To this end, the circuit cover 472 may include an accommodating space for accommodating therein and covering the circuit elements 481, in consideration of the shape and position of the circuit elements 481 disposed on the main board 480.

Meanwhile, the filter 470 may filter light within a specific wavelength range, among the light that has passed through the first lens unit 420, the liquid lens module 130, and the second lens unit 440. The filter 470 may be an infrared (IR) light blocking filter or an ultraviolet (UV) light blocking filter, but the embodiments are not limited thereto. The filter 470 may be disposed above the image sensor 300. The filter 470 may be disposed inside the sensor base 460.

The sensor base 460 may be disposed below the middle base 450, and may be attached to the main board 480. The sensor base 460 may surround the image sensor 300, and may protect the image sensor 300 from foreign substances or external impacts.

The main board 480 may be disposed below the sensor base 460, the sensor base 460 may be mounted on the main board 480 so as to be spaced apart from the circuit elements 481, and the holder 430 in which the middle base 450, the second lens unit 440, the liquid lens module 130, and the first lens unit 420 are disposed may be disposed above the Sensor base 460.

Hereinafter, a comparison between a comparative example and the camera module according to the embodiment will be made. The comparative example set forth herein is merely illustrative in order to help understand the effects of the camera module according to the embodiment.

FIG. 13 is a partial plan view of a camera module according to the comparative example.

The camera module according to the comparative example shown in FIG. 13 includes a liquid lens 10 and a thermistor 20.

The liquid lens 10 may include a common electrode CO (denoted by E2 in FIG. 13) and an insulation layer IS. Here, the common electrode CO and the insulation layer IS respectively correspond to the second electrode E2 and the insulation layers IS1 and IS2 according to the above-described embodiment. The insulation layer IS may be omitted. The thermistor: performs the same function as the temperature detection element 120 according to the above-described embodiment, which is used to sense the temperature of the liquid lens 10.

In a plan view, the thermistor 20 according to the comparative example shown in FIG. 13 is disposed in the vicinity of one side of the liquid lens 10. Accordingly, the lengths of lines 20L of the pattern of the thermistor 20 may increase, and the interval between the lines 20L may decrease, whereby the lines 20L may be deformed by heat, structural design thereof may be complicated, and a manufacturing process may be difficult. In contrast, in the case of the camera module 1000 or 1000A according to the embodiment, since the first temperature detection element 122A or 122B and the second temperature detection element 124A or 124B are disposed on both sides of the first surface SF1 of the liquid lens 110A, the lengths of lines of the temperature detection elements 120A and 120B are not required to be long, and the interval between the lines (e.g. "d" shown in FIG. 6) may be greater than that in the comparative example shown in FIG. 13. Accordingly, compared to the comparative example, the lines of the temperature detection elements 120A and 120B according to the embodiment are less likely to be deformed by heat, structural design thereof a may be simplified, and manufacturing process may be facilitated.

In addition, referring to FIG. 3, the area of the first opening O1 in the first surface SF1 of the first plate P1, on which the first electrodes E1, which are the individual electrodes, are disposed, is smaller than the area of the second opening O2 in the second surface SF2 of the first plate P1, on which the second electrode E2, which is the common electrode, is disposed. Accordingly, the first surface SF1 has a larger area in which to dispose the temperature detection elements 120A and 120B than the second surface SF2 of the first plate P1. In the case of the comparative example shown in FIG. 13, the thermistor 20 is disposed on the second surface SF2, on which the common electrode CO (E2) is disposed. In this case, if the thermistor 20 and the common electrode CO are not sufficiently spaced apart from each other, the first liquid LQ1 connected to the common electrode CO and the thermistor 20 may be short-circuited. In order to prevent this, it is required for the thermistor 20 and the common electrode Co to be sufficiently spaced apart from each other, which leads to an increase in the area of the liquid lens 10. In contrast, according to the embodiment, since the temperature detection elements 120A and 120B are disposed on the first surface SF1, which is wider than the second surface SF2, it is not necessary to increase the area of the liquid lens 110A, and the temperature detection elements 120A and 120B and the second electrode E2, which is the common electrode CO, are prevented from being short-circuited, compared to the comparative example. Accordingly, the embodiment may exhibit electrical characteristics superior to those of the comparative example.

Further, because the comparative example is provided with one thermistor 20, there is a limitation on the range within which the resistance value necessary for the operation of the thermistor 20 and the amount of change thereof can be adjusted. In contrast, since the camera module according to the embodiment is provided with a plurality of temperature detection elements 120A and 120B, there may be less limitation on the range within which the resistance value necessary for the operation of the temperature detection elements 120A and 120B and the amount of change thereof can be adjusted compared to the comparative example.

Although only a limited number of embodiments have been described above, various other embodiments are possible. The technical contents of the above-described embodiments may be combined into various forms as long as they are not incompatible with one another, and thus may be implemented in new embodiments.

Meanwhile, an optical device may be implemented using a camera module 1000 or 1000A including the liquid lens according to the embodiments described above. Here, the optical device may include a device that may process or analyze optical signals. Examples of the optical device may include camera/video devices, telescopic devices, microscopic devices, an interferometer, a photometer, a polarimeter, a spectrometer, a reflectometer, an auto-collimator, and a lens-meter, and the embodiments may be applied to optical devices that may include a lens assembly.

In addition, the optical device may be implemented in a portable device such as, for example, a smartphone, a laptop computer, and a tablet computer. Such an optical device may include the camera module 1000 or 1000A, a display unit (not shown) configured to output an image, a battery (not shown) configured to supply power to the camera module 1000 or 1000A, and a body housing in which the camera module 1000 or 1000A, the display unit, and the battery are mounted. The optical device may further include a communication module, which may communicate with other devices, and a memory, which may store data. The communication module and the memory may also be mounted in the body housing.

It will be apparent to those skilled in the art that various changes in form and details may be made without departing from the spirit and essential characteristics of the disclosure set forth herein. Accordingly, the above detailed description is not intended to be construed to limit the disclosure in all aspects and to be considered by way of example. The scope of the disclosure should be determined by reasonable interpretation of the appended claims and all equivalent modifications made without departing from the disclosure should be included in the following claims.

MODE FOR INVENTION

Various embodiments have been described in the best mode for carrying out the disclosure.

INDUSTRIAL APPLICABILITY

A camera module including a liquid lens according to embodiments may be used in camera/video devices, telescopic devices, microscopic devices, an interferometer, a photometer, a polarimeter, a spectrometer, a reflectometer, an auto-collimator, a lens-meter, a smartphone, a laptop computer, a tablet computer, etc.

The invention claimed is:
1. A camera module, comprising:
a liquid lens comprising a first plate and an individual electrode disposed on a first surface of the first plate;
a plurality of temperature detection elements disposed on the first surface of the first plate so as to be spaced apart from the individual electrode; and
a temperature sensor connected to the plurality of temperature detection elements to sense a temperature of the liquid lens,
wherein the plurality of temperature detection elements comprises first and second temperature detection elements spaced apart from each other,
wherein the temperature sensor is connected to one end of the first temperature detection element,
wherein an opposite end of the first temperature detection element is directly electrically connected to one end of the second temperature detection element, and an opposite end of the second temperature detection element is connected to a reference potential, and
wherein the first plate comprises a second surface formed opposite the first surface, and an area of the first surface is larger than an area of the second surface.

2. The camera module according to claim 1, comprising:
a connection substrate connected to the individual electrode;
an image sensor; and
a main board on which the image sensor is mounted,
wherein the temperature sensor is disposed on the main board.

3. The camera module according to claim 2, wherein the opposite end of the first temperature detection element and the one end of the second temperature detection element are connected to each other via the main board.

4. The camera module according to claim 2, wherein the liquid lens includes a second plate disposed on the first surface of the first plate.

5. The camera module according to claim 4, wherein the first and second temperature detection elements are disposed between the first surface of the first plate and the second plate.

6. The camera module according to claim 4, wherein the second plate includes a plurality of recesses exposing the one end and the opposite end of each of the first and second temperature detection elements, and
wherein the connection substrate includes a plurality of protruding portions protruding toward the liquid lens, to be connected to the one end and the opposite end of each of the first and second temperature detection elements exposed in the plurality of recesses.

7. The camera module according to claim 1, wherein the one end and the opposite end of the first temperature detection element are disposed in a first edge area of the liquid lens, and
wherein the one end and the opposite end of the second temperature detection element are disposed in a second edge area of the liquid lens, the second edge area being opposite the first edge area.

8. The camera module according to claim 1, wherein the first temperature detection element and the second temperature detection element are disposed so as to face each other, with a center of the liquid lens interposed therebetween.

9. The camera module according to claim 1, wherein the first and second temperature detection elements have a same resistance value.

10. The camera module according to claim 1, wherein the temperature sensor comprises:
a sensing driver configured to supply a driving signal to the one end of the first temperature detection element; and a temperature information measurer connected to the one end of the first temperature detection element to measure temperature information of the plurality of temperature detection elements.

11. The camera module according to claim 10, wherein the sensing driver supplies the driving signal in a form of current or in a form of voltage.

12. The camera module according to claim 1, wherein each of the first temperature detection element and the second temperature detection element comprises a resistor or a thermistor, a value of the resistor or the thermistor changing with changes in temperature.

13. The camera module according to claim 1, wherein the liquid lens comprises a first liquid and a second liquid accommodated in a cavity of the first plate,
wherein the first plate includes a first opening and a second opening, the first and second openings defining the cavity,
wherein the first opening has a smaller area than the second opening, and
wherein the first surface is a surface around the first opening and the second surface is a surface around the second opening.

14. The camera module according to claim 1, wherein the first temperature detection element has a right-bracket planar shape, and the second temperature detection element has a left-bracket planar shape.

15. The camera module according to claim 1, wherein each of the first and second temperature detection elements has a serpentine planar shape.

16. The camera module according to claim 1, comprising an insulation layer disposed between each of the first and second temperature detection elements and the individual electrode.

17. The camera module according to claim 1, wherein the first temperature detection element and the second temperature detection element face each other in a first direction,
wherein the first direction is perpendicular to a second direction of an optical axis direction,
wherein a third direction is perpendicular to each of the first and second directions, and
wherein the first temperature detection element and the second temperature detection element have planar shapes, which are symmetric to each other with respect to a surface, which is parallel to each of the second direction and the third direction and passes through a center of the liquid lens.

18. A camera module, comprising:
a liquid lens, the liquid lens comprising:
a first plate;
a first electrode disposed on a first surface of the first plate; and
a second electrode disposed on a second surface formed opposite the first surface,
a first temperature detection element and a second temperature detection element disposed while being spaced apart from each other, on a same surface, which is a wider surface among the first surface and the second surface of the first plate; and
a temperature sensor connected to the first temperature detection element and the second temperature detection element to sense a temperature of the liquid lens,
wherein the first temperature detection element and the second temperature detection element are disposed on both sides of the first surface, respectively, wherein an opposite end of the first temperature detection element is directly electrically connected to one end of the second temperature detection element, and an opposite end of the second temperature detection element is connected to a reference potential, and
wherein an area of the first surface is larger than an area of the second surface.

19. The camera module according to claim 18, wherein the liquid lens comprises a first liquid and a second liquid accommodated in a cavity of the first plate,
wherein the first plate includes a first opening and a second opening, the first and second openings defining the cavity,
wherein the first opening has a smaller area than the second opening, and
wherein the first surface is a surface around the first opening and the second surface is a surface around the second opening.

* * * * *